United States Patent

[11] 3,524,460

[72] Inventor Thomas W. Bermel
Corning, New York

[21] Appl. No. 642,417
[22] Filed May 31, 1967
[45] Patented Aug. 18, 1970
[73] Assignee Corning Glass Works
Corning, New York
a Corp. of New York

[54] SATURABLE PROPORTIONAL FLUID AMPLIFIER DEVICE
7 Claims, 8 Drawing Figs.

[52] U.S. Cl. .................... 137/81.5
[51] Int. Cl. .................... F15c 1/14
[50] Field of Search .................... 137/81.5

[56] References Cited

UNITED STATES PATENTS

| | | | |
|---|---|---|---|
| 3,170,476 | 2/1965 | Reilly | 137/81.5 |
| 3,339,571 | 9/1967 | Hatch, Jr. | 137/81.5 |
| 3,396,619 | 8/1968 | Bowles et al. | 137/81.5 |

*Primary Examiner*— M. Cary Nelson
*Assistant Examiner*— William R. Cline
*Attorneys*— Clarence R. Patty, Jr. and Walter S. Zebrowski

ABSTRACT: A proportional fluid amplifier device wherein an increase in the differential input pressure across the control nozzles thereof, beyond the working range, does not cause the differential output pressure to reverse and decrease.

INVENTOR.
THOMAS W. BERMEL
BY Walter S. Zabrowski
ATTORNEY

INVENTOR.
THOMAS W. BERMEL
BY Walter S. Zebrowski
ATTORNEY

SATURABLE PROPORTIONAL FLUID AMPLIFIER DEVICE

BACKGROUND OF THE INVENTION

Unlike an ordinary bistable "lock-on" type fluid amplifier wherein the power stream locks on to one wall or the other of an interaction chamber and the power stream fluid is directed substantially entirely to one or the other of a pair of outlet passages in response to fluid signals applied to the control nozzles thereof, a proportional fluid amplifier does not lock on to either wall and distributes or apportions the power stream between the outlet passages in response to the pressure differential across the control nozzles. A proportional fluid amplifier is therefore an analog device. Proportional fluid amplifiers may be either of the vent-type or center dump type. In either case, depending on the difference in pressures applied to the control nozzles the power stream may be directed entirely to one outlet passage or the other, porportioned between them, or may be deflected beyond both and vented to ambient. When the difference in pressure between the signals applied to the control nozzles is increased sufficiently to cause the power stream to be deflected either wholly or partly beyond the outlet passages such that at least a significant part of it is vented, the fluid amplifier is considered to be in the negative gain range thereof.

The gain of a proportional fluid amplifier is determined by the ratio of the difference between the pressures within the outlet passages to the difference of the pressures applied to the control nozzles. Within the working range, up to the negative gain point of the proportional fluid amplifier, that is the point at which the negative gain range begins, an increase in the pressure difference applied to the control nozzles results in an increase in the differential pressure within the outlet passages. After the negative gain point is reached, however, a further increase in the pressure difference applied to the control nozzles results in a decrease in the difference between the pressures in the outlet passages. This comes about because more and more of the power stream is vented rather than being passed through either of the outlet passages.

SUMMARY OF THE INVENTION

The objects of the present invention are to provide a saturable proportional fluid amplifier device which overcomes the heretofore noted disadvantages and which permits stabilization of the difference between the pressures of the outlet passages of the device with an increase in a difference of the pressures applied to the control nozzles upon reaching that point in the operation of the device at which the negative gain range would have ordinarily begun.

Broadly, according to the present invention first and second proportional fluid amplifiers are provided with a source of fluid input signals being connected to one control nozzle of the first proportional fluid amplifier with one of the outlets thereof being connected to one of the control nozzles of the second proportional fluid amplifier. Means for providing a biasing fluid is connected to the other of the control nozzles of each of the proportional fluid amplifiers, with the outlets of the second proportional fluid amplifier being the outlets of that device.

Additional objects, features, and advantages of the present invention will become apparent to those skilled in the art from the following detailed description and the attached drawings on which, by way of example, only the preferred embodiments of this invention are illustrated.

DETAILED DESCRIPTION

By the term fluid as used herein is meant any compressible fluid such as air, nitrogen, or other gases or incompressible fluid such as water or the like, which fluids may contain solid particles. This invention is not limited to any particular fluid.

Figure 1:
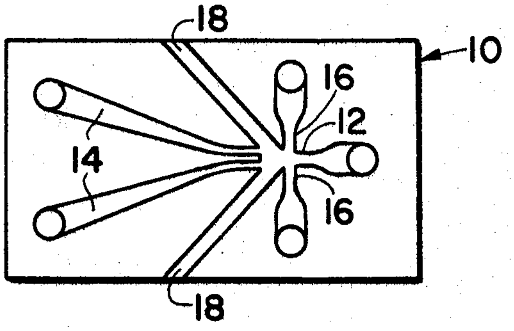
FIGURE 1 is a plan view of a vent-type proportional fluid amplifier.

FIGURE 1 illustrates a vent-type proportional fluid amplifier 10. Such a proportional fluid amplifier is one wherein the power stream emitted from power nozzle 12 is directed to one or the other or both of the outlet passages 14 in proportion to the magnitude of the fluid control signals applied to control nozzles 16. Entrainment fluid flow and venting of excess fluids is accomplished by means of vents 18.

Figure 2:
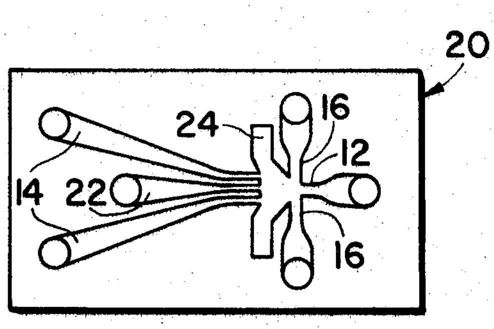
FIGURE 2 is a plan view of a center dump type proportional fluid amplifier.

Referring to FIGURE 2, a center dump proportional fluid amplifier 20 is illustrated. In such an amplifier the power stream may be directed to either of outlet passages 14 or the center vent or dump passage 22. Entrainment fluid flow and venting of excess fluids is also accomplished by means of passage 24. As is well known in the art, a center dump proportional fluid amplifier minimizes the secondary fluid flows within the device.

Figure 3:
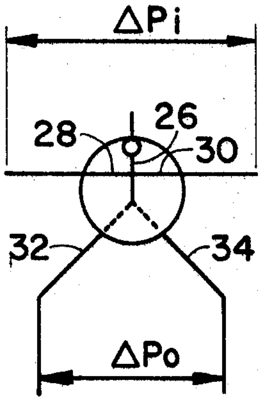
FIGURE 3 is a schematic illustration of a proportional fluid amplifier.

Referring to FIGURE 3, a schematic of a typical proportional fluid amplifier is shown embodying a power stream inlet nozzle 26, a pair of control nozzles 28 and 30, and a pair of outlet passages 32 and 34. The difference between the pressure applied to control nozzle 28 and control nozzle 30 is $\Delta P_i$. The difference between the pressure in outlet passage 32 and the pressure in outlet passage 34 is $\Delta P_o$. The gain of such a proportional fluid amplifier will then be equal to $\Delta P_o$ divided by $\Delta P_i$.

Figures 4, 5:
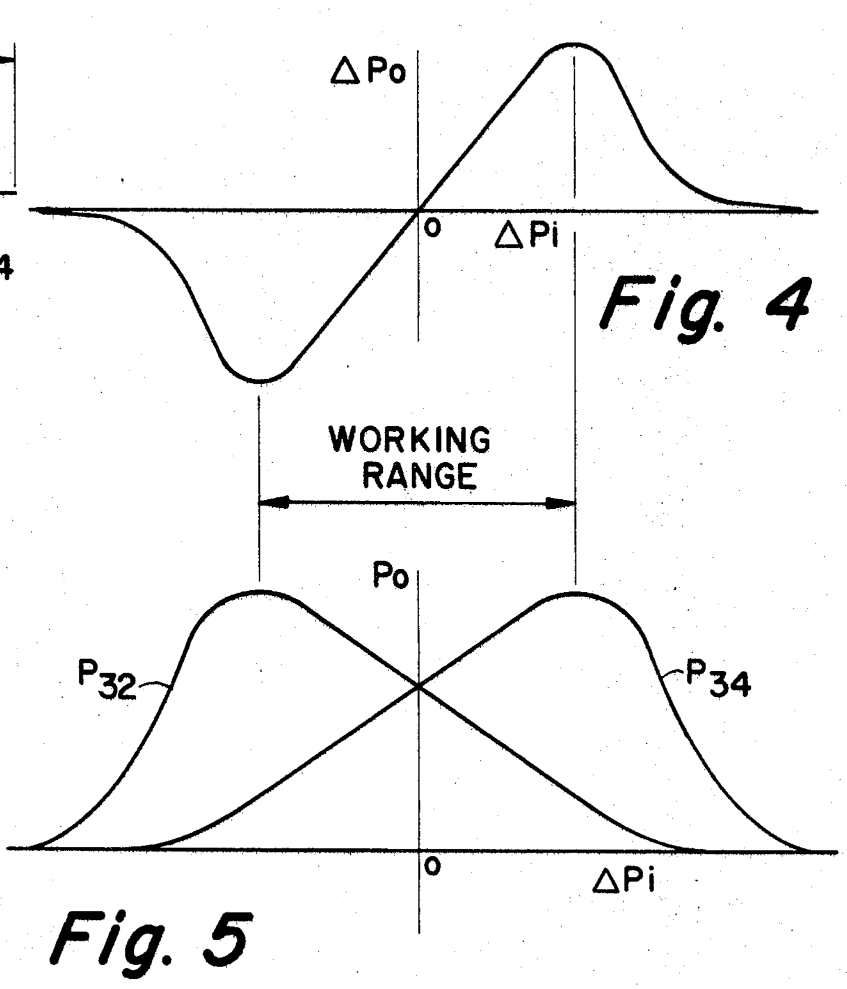
FIGURE 4 is a diagrammatic illustration of the input and output pressure difference relationships of a proportional fluid amplifier.
FIGURE 5 is a diagrammatic illustration of the pressures in the outlet passages of a proportional fluid amplifier in relation to the input pressures.

FIGURES 4 and 5 illustrate the pressure relationships of the proportional fluid amplifier of FIGURE 3. When $\Delta P_i$ equals zero, that is when the pressure of the fluid flowing through control nozzle 28 equals the pressure of the fluid flowing through control nozzle 30 $\Delta P_o$ will also be zero since the fluid flowing through outlet passage 32 will equal the fluid flowing through outlet passage 34. This condition is illustrated in FIGURE 4 by both the $\Delta P_o$ and $\Delta P_i$ intercepts being zero. This condition is also illustrated in FIGURE 5 wherein the outlet pressure $P_o$ in outlet passage 32, represented by curve $P_{32}$, is equal to the outlet pressure in outlet passage 34, represented by the curve $P_{34}$, when $\Delta P_i$ is equal to zero. When a signal is applied to either control nozzle 28 or control nozzle 30 so as to result in a $\Delta P_i$ value other than zero, $\Delta P_o$ similarly increases or decreases. This is illustrated in FIGURE 4 by the substantially linear portion of the curve shown within the working range. Within this same range, it is seen in FIGURE 5 that as $\Delta P_i$ is other than zero, the pressure within outlet passage 32 is different than the pressure within outlet passage 34 since the power stream emitted from nozzle 26 is now being divided between outlet passages 32 and 34 in an unequal manner in proportion to the inequality of the pressures of the fluid flowing through control nozzles 28 and 30. $\Delta P_i$ can then be increased to a point where the power stream emitted from nozzle 26 is deflected to a degree such that only a portion of it enters outlet passages 32 and 34 while a significant remainder is caused to vent to ambient. At this point, the proportional fluid amplifier is considered to have reached the negative gain point whereupon further increases in $\Delta P_i$ not only do not bring about increases in $\Delta P_o$ but rather bring about decreases in $\Delta P_0$ as is illustrated in FIGURE 4. This comes about from the fact that more of the power stream is vented and less of it enters the outlet passages. A point is then reached such that all of the power stream is deflected beyond the outlet passages and is vented whereupon $\Delta P_o$ will decrease to zero while $\Delta P_i$ will be very high. As is readily seen, beyond the working range of the proportional fluid amplifier, the gain is negative which condition is undesirable for most applications.

Figures 6, 7:
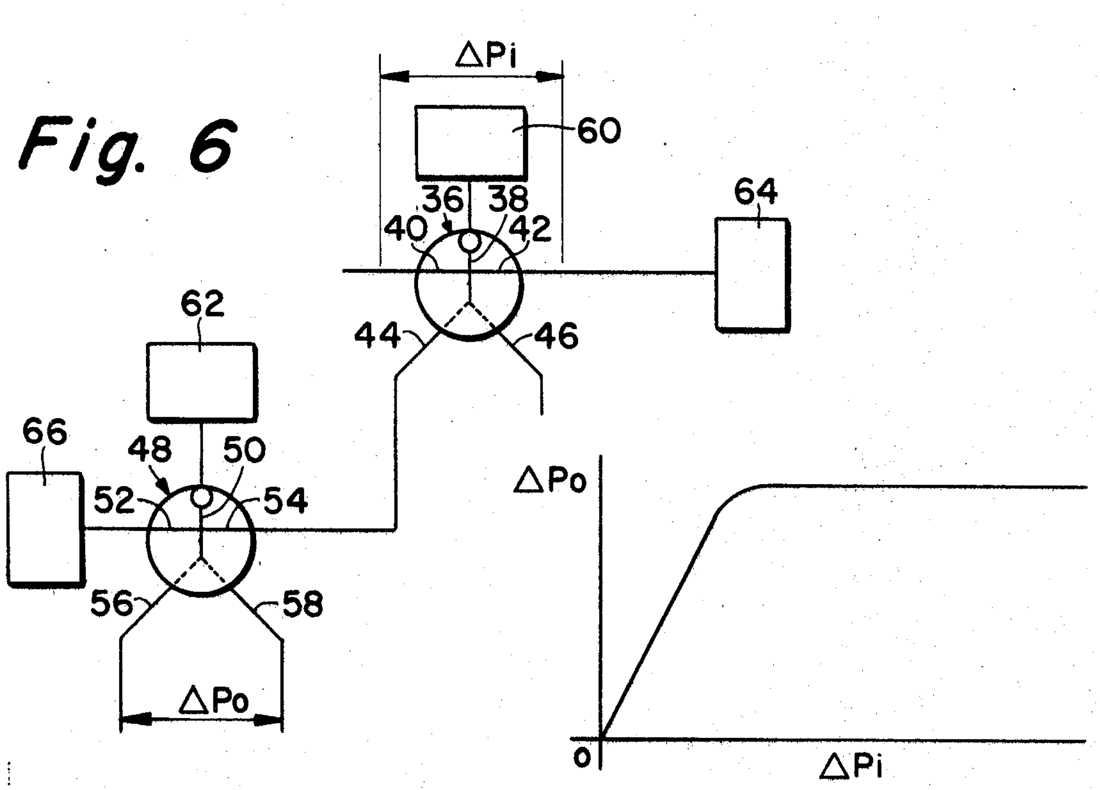
FIGURE 6 is a schematic diagram of the saturable proportional fluid amplifier device of the present invention.
FIGURE 7 is a diagrammatic illustration of the input and output pressure relationships of the device of the present invention.

The device of the present invention is illustrated in schematic form in FIGURE 6. A first proportional fluid amplifier 36 is provided having a power stream input nozzle 38, a pair of control nozzles 40 and 42, and a pair of outlet passages 44 and 46. A second proportional fluid amplifier 48 is shown with a power stream input nozzle 50, a pair of control fluid nozzles 52 and 54, and a pair of outlet passages 56 and 58. Fluid is provided to inlet nozzle 38 and 50 from suitable sources 60 and 62 respectively. Biasing fluid is provided to control nozzle 42 of fluid amplifier 36 from a suitable source 64, while biasing fluid is provided to control nozzle 52 of amplifier 48 from a source 66. The $\Delta P_i$ of this device will be the difference in the pressures of the fluid flowing through control nozzles 40 and 42 as indicated in FIGURE 6. $\Delta P_o$ will be the difference in pressures of the fluids within outlet passages 56 and 58.

Referring additionally to FIGURE 7, the operation of the circuit of FIGURE 6 will be as follows. Fluid signals, from any source as well known to one familiar with the art, are supplied to control nozzle 40 of amplifier 36. The power stream emitted from inlet nozzle 38 is proportioned between outlet passages 44 and 46 in accordance with the pressure of the signals applied to control nozzle 40 since the pressure of the biasing fluid emitted through control nozzle 42 will be constant. The portion of the power stream passing through outlet passage 46 is vented to ambient, while that portion passing through outlet passage 44 becomes the control fluid flow emitted through control nozzle 54 of amplifier 48. Therefore, $\Delta P_o$ will be a function of the pressure of the fluid flowing through control nozzle 54 since the pressure of the biasing fluid emitted from control nozzle 52 will be constant. As the pressure of the fluid signals passing through control nozzle 40 increases $\Delta P_o$ will likewise increase since the pressure in outlet passage 44 will decrease. When the pressure of the fluid passing through control nozzle 40 increases to a point where the power stream is entirely deflected past outlet passage 44 and all of it is passed through either outlet passage 46 or is otherwise vented, the lowest pressure which can be obtained in outlet passage 44 is zero. Consequently, with a fixed source of biasing fluid applied to control nozzle 52 of amplifier 48, $\Delta P_o$ can reach only a finite value, that is the pressure at control nozzle 52 minus zero, as illustrated in FIGURE 7, and then continue at that level regardless how high the value of $\Delta P_i$ becomes since the pressure within control nozzle 54 cannot be lower than zero. As is seen, the negative gain condition of prior art proportional fluid amplifiers is thereby eliminated.

Figure 8:
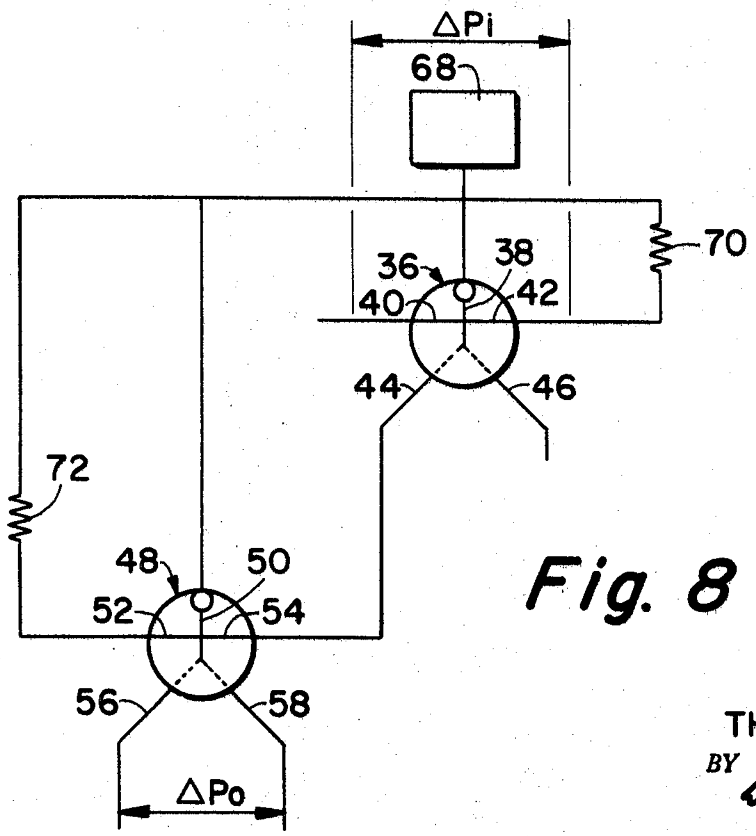
FIGURE 8 is a schematic diagram of another embodiment of the saturable proportional fluid amplifier device of the present invention.

The device illustrated in FIGURE 6 is shown with separate bias fluid sources as well as separate power stream fluid sources. The circuit may be operated from a single source 68 of fluid as shown in FIGURE 8. Source 68 is directly connected to inlet nozzles 38 and 50 of amplifiers 36 and 48 respectively. Source 68 of fluid is also connected to control nozzle 42 of amplifier 36 through fluid restrictor or resistor 70, and to control nozzle 52 of amplifier 48 through fluid restrictor or resistor 72. By means of restrictors 70 and 72 the pressure of the fluid source 68 can be stepped down to any suitable level as required for the biasing fluid for amplifiers 36 and 48.

The saturable proportional fluid amplifier of the present invention is suitable for use in generating a fluid log output signal of a fluid input signal, for detecting whether an air fan is operating, or the like.

I claim:

1. A saturable proportional fluid amplifier device comprising:
first and second proportional fluid amplifiers each having a power stream nozzle, a pair of control nozzles in substantially opposed relationship to one another, and a pair of outlets,
a source of fluid connected to each of the power stream nozzles of said proportional fluid amplifiers so as to cause a power stream to be emitted from each of said power stream nozzles,
a source of fluid input signals connected to one control nozzle of said first proportional fluid amplifier,
means providing flow communication connecting to one of the control nozzles of said second proportional fluid amplifer that outlet of said first proportional fluid amplifier to which the power stream thereof is directed in absence of said fluid input signals, and
means for providing a biasing fluid connected to the other of the control nozzles of each of said first and second proportional fluid amplifiers, the outlets of said second proportional fluid amplifier being the outlets of said device.

2. The saturable proportional fluid amplifier device of Claim 1 wherein said means for providing a biasing fluid is a source of fluid at constant pressure.

3. The saturable proportional fluid amplifier device of Claim 1 wherein said means for providing a biasing fluid comprises a fluid restrictor connected intermediate said source of fluid and each of said other control nozzles of said first and second proportional fluid amplifiers.

4. The saturable proportional fluid amplifier device of Claim 1 wherein said means connecting one of the outlets of said first proportional fluid amplifier connects said outlet to one of the control nozzles of said second proportional fluid amplifier in such a manner that an increase in the pressure of said fluid input signals causes a decrease in the pressure of the fluid flowing in said one of the outlets until substantially all of the power stream of said first proportional fluid amplifier is caused to flow through the other of said outlets of said first proportional fluid amplifier.

5. The saturable proportional fluid amplifier device of Claim 1 wherein the other outlet of said first proportional fluid amplifier is vented to ambient.

6. The saturable proportional fluid amplifier device of Claim 1 wherein said fluid is air.

7. A saturable proportional fluid amplifier device:
comprising a first proportional fluid amplifier having a power stream nozzle, a pair of control nozzles in substantially opposed relationship to one another, and a pair of outlets,
a second proportional fluid amplifier having a power stream nozzle, a pair of control nozzles in substantially opposed relationship to one another, and a pair of outlets,
a source of fluid connected to each of the power stream nozzles of each of said first and second proportional fluid amplifiers so as to cause a power stream to be emitted from each of said power stream nozzles,
a source of fluid input signals connected to one control nozzle of said first proportional fluid amplifier,
means providing flow communication connecting one of the outlets of said first proportional fluid amplifier to one of the control nozzles of said second proportional fluid amplifier such that an increase in the pressure of said fluid input signals causes a decrease in the pressure of the fluid in said one of the outlets until substantially all of the power stream of said first proportional fluid amplifier is caused to flow through the other of said outlets of said first proportional fluid amplifier,
said one of the outlets being that outlet of said first proportional fluid amplifier to which the power stream thereof is directed in absence of said fluid input signals,
a fluid restrictor providing flow communication connected intermediate said source of fluid and the other control nozzle of said first proportional fluid amplifier, and a fluid restrictor providing flow communication connected intermediate said source of fluid and the other control nozzle of said second proportional fluid amplifier, the outlets of said second proportional fluid amplifier being the outlets of said device.